Jan. 25, 1955
F. W. ROHE
2,700,172
SECTIONAL GROMMET FOR REINFORCING
OPENINGS IN PANELS AND SHEETS
Filed Jan. 28, 1952
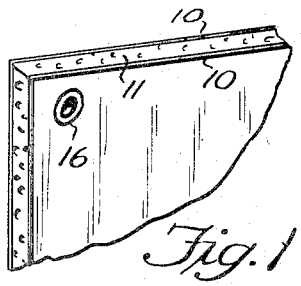
Fig. 1
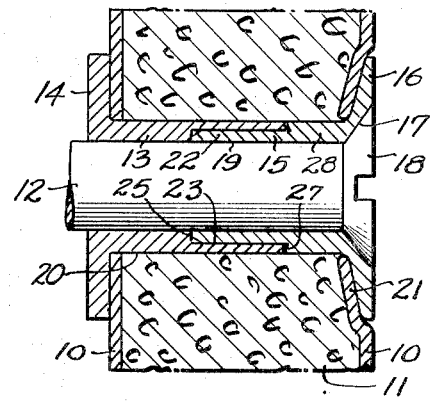
Fig. 2
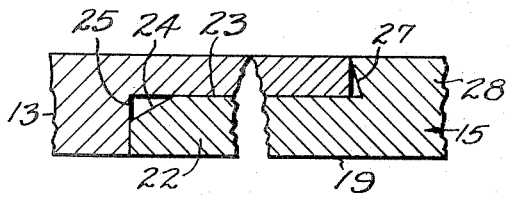
Fig. 5    Fig. 3
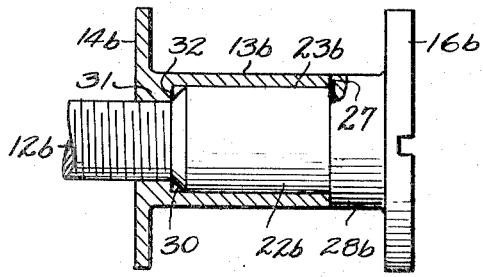
Fig. 6    Fig. 4
Fig. 8
Fig. 7
INVENTOR.
FREDERICK W. ROHE
BY
Lynn H. Latta
—ATTORNEY—

United States Patent Office 2,700,172
Patented Jan. 25, 1955

2,700,172

SECTIONAL GROMMET FOR REINFORCING OPENINGS IN PANELS AND SHEETS

Frederick W. Rohe, Beverly Hills, Calif.

Application January 28, 1952, Serial No. 268,515

4 Claims. (Cl. 16—2)

This invention relates generaly to grommets and has as its general object to provide a grommet which may be inserted in a panel or sheet to provide a reinforced aperture for reception of a screw or bolt or other securing device for attaching the panel to a structural member such as a joist or beam, or to attach instruments, equipment, or other structure to the panel.

In a somewhat broader aspect, the invention deals with the attachment of panels or sheets to supporting or supported members by means of a combination of coacting grommet and securing element.

The invention deals particularly with the problem of attaching light weight, laminated insulating panels to the structural longerons or stringers of an aircraft fuselage, railway cars, trucks, buildings, etc., and especially contemplates the improvement of ways and means of attaching to the structural members of an aeroplane fuselage, a new and highly successful type of wall panel, lining, or flooring which embodies a pair of spaced sheets of aulminum foil or sheet adhesively attached to opposite sides of a cellular, core lamination of metal foil, treated paper or thin fiber sheet, corrugated or otherwise wrinkled to provide a multitude of air cells between the aluminum sheets. Such a wall panel is relatively fragile because of this cellular structure and the thinness of the sheets of material composing it, and attempts to secure the same to structural members through un-reinforced holes bored in the panel, have not met with satisfactory success. Accordingly, there has developed a definite need for a relatively inexpensive means for reinforcing the openings in such panels. This need has not been fulfilled by conventional grommets, eyelets, etc., and the present invention seeks to meet that need.

Because of the fragile structure of the panel, the use of a one piece grommet or eyelet having one end intended to be spread radially outwardly to engage one face of the panel to anchor the grommet in place, results in an undesirable degree of mutilation of the panel around the opening. The present invention therefore contemplates a grommet in two sections adapted to telescope, one within the other and to become firmly united together when thus telescoped.

One of the primary objects of the invention is to provide a two part grommet or grommet and securing element combination, the sections of which may be united very readily and quickly in a panel opening without damaging the material of the panel around the opening. It is also essential that the process of inserting the grommet or grommet and securing element combination be rapid and inexpensive. The invention solves these problems by providing a pair of sections which become united by frictional interengagement and which, when thus united, rely entirely upon each other for support against axial loads tending to push them closer together or to pull them apart, so as to place no load upon the surrounding structure of the wall panel, other than the radial loads transmitted directly between the panel and the grommet as the result of any shear load developed between the wall panel and the mounting or mounted member, and the axial loads transmitted between the outer heads of the grommet and the exposed face of the panel. In this connection, the invention contemplates a sectional grommet structure or grommet and securing element combination having heads.

Another object is to provide a sectional grommet or grommet and securing element combination, in which one of the sections comprises a tubular element which is expanded by insertion of the other section therein, the respective diameters of the two sections being so related that the expansion is controlled below a limit at which the tubular section would tend to fail.

Other objects will become apparent in the ensuing specifications and appended drawings in which:

Fig. 1 is a perspective view of a portion of a wall panel having one of my improved grommets installed in the corner thereof;

Fig. 2 is a sectional view through a portion of such a panel illustrating the grommet in section and showing a securing element extending therethrough;

Fig. 3 is an axial sectional view of a modified form of the grommet;

Fig. 4 is an axial sectional view of a securing element embodying another modification of the invention;

Fig. 5 is an enlarged fragmentary axial sectional view of the grommet of Fig. 2;

Fig. 6 is a sectional view of another modified form of the invention;

Fig. 7 is a sectional view of another modified form of the invention; and

Fig. 8 is a sectional view of another modified form of the invention.

Referring now to the drawings in detail, I have shown in Fig. 1 a portion of a wall panel embodying facings 10 of thin sheet aluminum or the like, and a core lamination 11 of metal foil crinkled or corrugated, treated paper or thin fiber sheet, to which the facing sheets 10 are adhesively secured. Such a panel is fairly fragile and an attempt to secure the same to a structural beam or the like by simply drilling holes through its marginal portions and inserting screws or bolts through such holes, has not proved to be satisfactory for the reason that stresses and strains set up between the panel and the structural members, tend to tear the panel at the holes. Furthermore, any attempt to cinch a screw or bolt tightly against the panel will simply result in crushing the panel and thus impairing the appearance of the wall surface at the point of attachment.

My invention, as illustrated in Fig. 1, provides a grommet which is inserted through an oversize opening 20 in the panel and which in turn provides an opening the proper size to receive a rivet, bolt or screw such as is indicated at 12 in Fig. 2. The grommet is in two sections, including an outer section having a tubular shank portion 13 and a head portion 14, and an inner section having a tubular shank portion 15 and a head portion 16. In most cases one of the head portions will be flat, e. g. the flat head 14. The head of the other section may be frusto-conical (e. g. the head 16) to provide a countersunk recess 17 to receive a conical type screw head (e. g. head 18 of Fig. 2).

Inner tubular member 15 has a bore 19 which provides a cylindrical opening to receive the shaft of screw 12. Outer tubular member 13 is adapted to fit in opening 20 which may be punched or bored through the panel in which the grommet is installed. Flat head 14 bears snugly against the facing sheet 10 on one side of the panel. Where a conical head 16 is employed, the opposite facing sheet may be dimpled as at 21, to receive head 16 in a flush relation to said opposite sheet. Dimpling will be effected simply by pressing the grommet sections together, without the use of tools.

Inner tubular member 15 has an end portion 22 consisting in a cylindrical inner of reduced external diameter, receivable, with an interference fit, in a counterbore 23 in the end portion of outer tubular member 13. Counterbore 23 constitutes said last-mentioned end portion an outer cylindrical flange. The end of reduced portion 22 is chamfered as at 24 at an angle of 30° to the grommet axis, to facilitate insertion in counterbore 23. External diameter of reduced portion 22 is slightly larger (of the order of .004"–.006") than the diameter of counterbore 23, whereby the insertion of reduced portion 22 causes a slight stretching of the counterbored end portion of tubular member 13, without, however, stretching it to its elastic limit or in any way causing it to fail. In such stretching, bore 23 is expanded and the skin thereof is placed under compression. At the same time the outer wall of inner member 22 is compressed inwardly to a reduced-radius contour matching that of expanded bore 23. Thus compression occurs in both interengaging faces. Compressive interengagement is progressively extended from the point of initial engagement at the mouth of counterbore 23, toward the head 14, as the two grommet sections are driven together, until, in the fully assembled grommet, it extends substantially the full length of the reduced portion 22 and counterbore 23, the compression being increasingly greater toward head 16.

At this point it may be noted that both sections of the grommet are made of a relatively soft metal or plastic, adapted upon compression of the surfaces of reduced portion 22 and counterbore 23, to establish a secure grip between these surfaces. A preferred material is aluminum, which may be surface-hardened by anodyzing. However, the invention contemplates the possible use of other soft metals, either ferrous or non-ferrous, and plastics (i. e. synthetic resin materials).

Under the conditions specified above, the two sections of the grommet may be easily brought together with the inner member 22 readily inserted into the outer tubular member; and with a moderate degree of pressure the inner tubular member 22 may be completely telescoped into the bore 23 of the outer tubular member 15, resulting in the very secure and lasting locking of the two tubular members relative to each other.

The conical end 24 of the inner tubular member, as it enters bore 23, smoothly spreads bore 23 without scoring the same. Scoring would produce striations, extending longitudinally of bore 23, which by rupturing the skin of bore 23, would greatly increase the tendency of the tubular member 13 to fail by cracking under the circumferential tension set up therein. In contrast to such tendency, the smooth ironing effect of the conical end 24 tends to compact the skin of bore 23, increasing its capacity to resist failure.

The limit of relative movement between the tubular members 15 and 13 is determined by engagement of the unheaded end of outer tubular member 13 against a shoulder 27, where reduced portion 22 joins a full thickness portion 28 of tubular member 15. Shoulder 27 is undercut, and frusto-conical (Fig. 4) being inclined at an angle of about 10°–15° to a plane normal to the grommet axis. Consequently, end pressure between shoulder 27 and the end of member 13, instead of tending to spread the latter so as to slip past the shoulder 27, will tend to draw the end of member 13 more snugly around member 15.

The chamfered end 24 of member 22 bottoms against a shoulder 25, defined between the bottom of counterbore 23 and a full thickness portion of tubular member 13 extending from said bottom to head 14. However, any tendency of member 22 to be deflected inwardly by such bottoming engagement, is resisted by the securing element 12 which fills the bore of member 22.

The overall length of the grommet is determined, with reference to the particular panel thickness, so as to allow a slight degree of compression of the panel between heads 14, 16, sufficient to bring the outer face of the frusto-conical head 16 flush with the outer surface of the adjoining facing sheet 10 as indicated in Fig. 2. Such compression has the added advantage of establishing a frictional engagement between the heads and the respective facing sheets, so that the grommet is secured to the panel not only by the engagement of the outer wall 20 of tube section 13 within panel opening 21, but also by the frictional grip of heads 14, 16 against facing sheets 10.

In actual practice, my improved grommet reinforces the panel to the extent that the resistance to tearing of the panel at a point of attachment, is increased several times.

Improved results may be obtained by applying a cement or other adhesive to the inner surfaces of heads 14, 16 and to the outer surface of tubular member 13.

One of the major advantages of the invention is the protection of the panel against crushing when a screw or bolt 12 is drawn tightly against the exposed face of the panel, drawing the panel against the mounting or mounted structure. The grommet has a very high degree of resistance to axial compression to a dimension smaller than its axial dimension when assembled, whereas the resistance to crushing of the panel itself is very low. All of the axial loads set up by drawing the rivet, screw or bolt tight, are taken by the grommet, and they are not transmitted to the panel. Thus the crushing of the panel as the rivet, screw or bolt is drawn tight is completely eliminated, and it is easy to install the panel with a uniform flush relation between the rivet, screw or bolt head and the exposed face of the panel, avoiding unsightly recesses previously caused by drawing a rivet, bolt or screw tightly against the naked face of the panel itself.

The resistance to tearing under shear loads is also greatly increased. The diameter of the outer wall of the grommet being considerably greater than that of the screw shaft, a much greater area of support between the grommet and the wall 20 of the panel opening is obtained than in the case of direct contact between a screw shaft and a bare opening in the panel. Also, the interengagement between heads 14 and 16 and the respective facing sheets 10, distributes the shear stresses over a much larger area of the sheets 10 and thereby greatly increases the resistance to tearing.

Fig. 3 illustrates how both grommet sections may have flat heads, a flat head 16a being used instead of the conical head 16 of Fig. 2, other parts being referred to by the same reference numerals as in Fig. 2.

Fig. 4 illustrates that both heads may by frusto-conical (heads 14a and 16).

In Fig. 6 is illustrated a modification of the invention in which, instead of a second grommet section, there is provided a solid, integral stud including a head 16b, a solid collar portion 28b, an intermediate stud section 22b adapted to be received with a tight frictional fit in bore 23b of tubular portion 13b, and a further reduced shaft portion 12b which may be threaded for attachment to a supporting structural member or a supported piece of equipment. Intermediate section has a conical shoulder 30 adapted to cooperate with the end of tubular portion 13b, for easy insertion of stud section 22b into tubular portion 13b.

Formed integrally with tubular portion 13b is a head 14b which is continued radially inwardly to provide a flange or collar 31 defining a reduced opening in which stud 12b is snugly received. Shoulder 30 may bottom against a shoulder 32 (the inner face of collar 31).

The outer diameter of solid collar section 28b is the same as that of tubular portion 13b, whereby the two members cooperate to fill the hole in which the securing device is installed. The relative diameters of intermediate section 22b and the bore 23b is substantially the same as that specified for the grommet of Fig. 2, and the same expanding action of tubular member 13b occurs.

Fig. 7 shows a further modification of the invention, in which a securing device, of the same general character as that shown in Fig. 6, has a conical head 16c, a full diameter collar or shoulder portion 28c, an intermediate solid stud section 22c, and a threaded shaft section 12c, with a conical shoulder 30c defining the offset between sections 22d and 12c. The tubular member 13c in this instance has a bore 23c of uniform diameter throughout, and the shoulder 30c does not bottom against a shoulder as in the device of Fig. 4.

In the form of the invention shown in Fig. 8, which is a securing device of the same general nature as that of Fig. 6, a solid stud member has a flat head 16d, a shoulder section 28d, and a reduced shaft section 12d which has an unthreaded portion 22d receivable with a tight frictional fit in the bore 23d of tubular member 13d. Tubular member 13d has a conical head 14d. Bore 23d is of uniform diameter throughout, and the end of tubular member 13d has a beveled mouth 25d which facilitates insertion of screw shaft 12d into the bore 23d. Screw shaft portion 12d is reduced in diameter sufficiently below the diameter of shaft portion 22d to allow the threads to clear the bore 23d without scraping against the wall thereof. The shoulder 30d between threaded shaft portion 12d and intermediate shaft portion 22d is preferably conical to facilitate the even spreading of bore 23d without scoring the surface thereof.

This feature of spreading the tubular portion 13, 13a, 13b, 13c, 13d smoothly without scoring, is a function that is performed by the conical nose 24, or conical shoulder 30, 30c, 30d, as the case may be, in each instance. Scoring would tend to greatly weaken the grommet sleeve 13, 13b, 13c, 13d, etc., since the striations produced by scoring would extend longitudinally of bore 23, 23b, c, d, etc., and with the tubular member stretched and under tension circumferentially, any tendency toward failure would be greatly accentuated by the striations, since the wall of the tubular member would tend to crack at the striations.

I claim:

1. In a grommet for reinforcing an opening for a securing element in a fragile wall panel: a pair of grommet sections each comprising a tubular shank and a head extending radially from one end thereof, said shanks in the assembled grommet having a common bore of uniform diameter substantially the full length thereof for reception of a securing element, and having a common cylindrical external wall of uniform diameter substantially the full length thereof, adapted to be snugly received in said opening and to support the panel material around said opening, one of said shanks having at its other end a circumferentially continuous, imperforate cylindrical axially extending outer flange the inner wall of which consists in a counterbore of larger diameter than said common bore, the other of said shanks having at its other end an axially projecting circumferentially continuous, imperforate cylindrical inner flange the outer wall of which is of a diameter to be received within said counterbore with an interference fit such as to attach said sections securely together within said opening, with the respective head engaging the opposite faces of the panel; said other shank having, at the base of said inner flange, an undercut frusto-conical shoulder for engagement by the end of said outer flange, and having, on the end of said inner flange an externally chamfered, conical nose, the reception of the respective body portions of the tubular shanks within said opening being effective to establish sufficient coaxiality between the shanks to initially guide said nose into the counterbore of the outer flange, the outer wall of said inner flange being originally of slightly larger diameter than said counterbore, resulting in the stretching of said outer flange as the two grommet sections are driven together, whereby in the assembled grommet the two sections are locked together by circumferential tension in the stretched outer flange and compression in the inner flange, the outer flange thereby securely gripping the inner flange.

2. A grommet for reinforcing an opening for a bolt, nut or rivet in a fragile wall panel, comprising: a pair of grommet sections each consisting in a tubular shank and a head extending radially from one end of said shank, said shank, in the assembled grommet, having a common bore of uniform diameter substantially the full length thereof, for reception of a securing element, and having a common cylindrical outer wall of uniform diameter substantially the full length thereof, for snug reception within said opening, so as to support the material of the wall panel around said opening with the respective heads in engagement with the opposite faces of the panel, one of said shanks having a body portion, adjoining its head, of full thickness equivalent to the distance radially between said common bore and said common outer wall and having, at its other end, a circumferentially continuous, imperforate cylindrical outer flange projecting axially from said body portion, with the outer wall of said flange forming a part of said common outer wall and with the inner wall of said flange consisting in a counterbore of larger diameter than said common bore, the other shank having an imperforate, circumferentially continuous inner flange projecting radially therefrom, the inner wall of said inner flange constituting a portion of said common bore and said inner flange having an outer wall of less diameter than that of said common outer wall, such as to be received within said counterbore with an interference fit adapted to attach said sections securely together within said opening said inner flange having at its end an externally chamfered, conical nose for initiating the insertion of said inner flange into said outer flange in the operation of assembling said grommet, the reception of the respective body portions of the tubular shanks within said opening being effective to establish sufficient coaxiality between the shanks to initially guide said nose into the counterbore of the outer flange.

3. A grommet for reinforcing an opening for a securing element in a fragile wall panel, consisting in: a pair of grommet sections each consisting in a tubular shank and a head extending radially from one end thereof, said shanks, in the assembled grommet, having a common bore of uniform diameter the full length thereof, for reception of a securing element, and having a common cylindrical outer wall of uniform diameter the full length thereof, for snug reception within said opening and for supporting the material of said panel surrounding said opening, with said heads in engagement with the opposed faces of said panel, each of said tubular shanks having, adjoining its head, a cylindrical tubular body portion of full thickness equivalent to the radial distance between said common outer wall and said common bore, one of said shanks having an imperforate, circumferentially continuous outer cylindrical flange projecting axially from its body portion, with the outer wall thereof constituting a portion of said common outer wall and having a cylindrical inner wall consisting in a counterbore therein, the other shank having an imperforate, circumferentially continuous inner cylindrical flange projecting axially from its body portion, the inner wall of said inner flange constituting a portion of said common bore and said inner flange having a cylindrical outer wall of less diameter than said common outer wall, such as to be received with an interference fit within said counterbore, to securely attach said sections together within said opening by frictional interlocking engagement, said one shank having an internal shoulder constituting an offset between said counterbore and said common inner wall, said shoulder substantially engaging the end of said inner flange in the assembled grommet, and said other shank having an external shoulder constituting an offset between its outer wall and said common outer wall, said last mentioned shoulder engaging the end of said outer flange in the assembled grommet, whereby said common outer wall is continuous throughout its length.

4. A grommet as defined in claim 3, wherein said inner flange has an externally chamfered, conical nose with a squared end, for piloting the insertion of said inner flange into said outer flange, the reception of the respective shank body portions being effective to align said nose with said counterbore for entry therein; wherein the outer wall of said inner flange is originally of a diameter slightly larger than that of said counterbore by an amount which is of the order of .001 inch, said conical nose functioning further to stretch said outer flange while avoiding splitting thereof or scoring such as would tend to cause failure thereof as the result of said stretching; and wherein said external shoulder is undercut and frusto-conical, so as to provide a leading edge of acute angle section where it intersects said outer wall, whereby to prevent spreading of said outer flange upon compressive engagement with said external shoulder; and wherein said outer flange has a squared end for engagement with said leading edge.

References Cited in the file of this patent

UNITED STATES PATENTS

| | | |
|---|---|---|
| 51,910 | Barbaroux | Jan. 9, 1866 |
| 749,438 | Harrington | Jan. 12, 1904 |
| 877,061 | Earnest | Jan. 21, 1908 |
| 1,824,838 | Root | Sept. 29, 1931 |
| 2,030,165 | Huck | Feb. 11, 1936 |
| 2,099,678 | Curtis | Nov. 23, 1937 |
| 2,129,167 | Cunnington | Sept. 6, 1938 |
| 2,392,133 | Eklund | Jan. 1, 1946 |
| 2,501,465 | Caramanoff | Mar. 21, 1951 |